Dec. 26, 1967     L. VAN BEY     3,359,782
WELL BORE INCLINOMETER APPARATUS
Filed Aug. 17, 1965     2 Sheets-Sheet 1
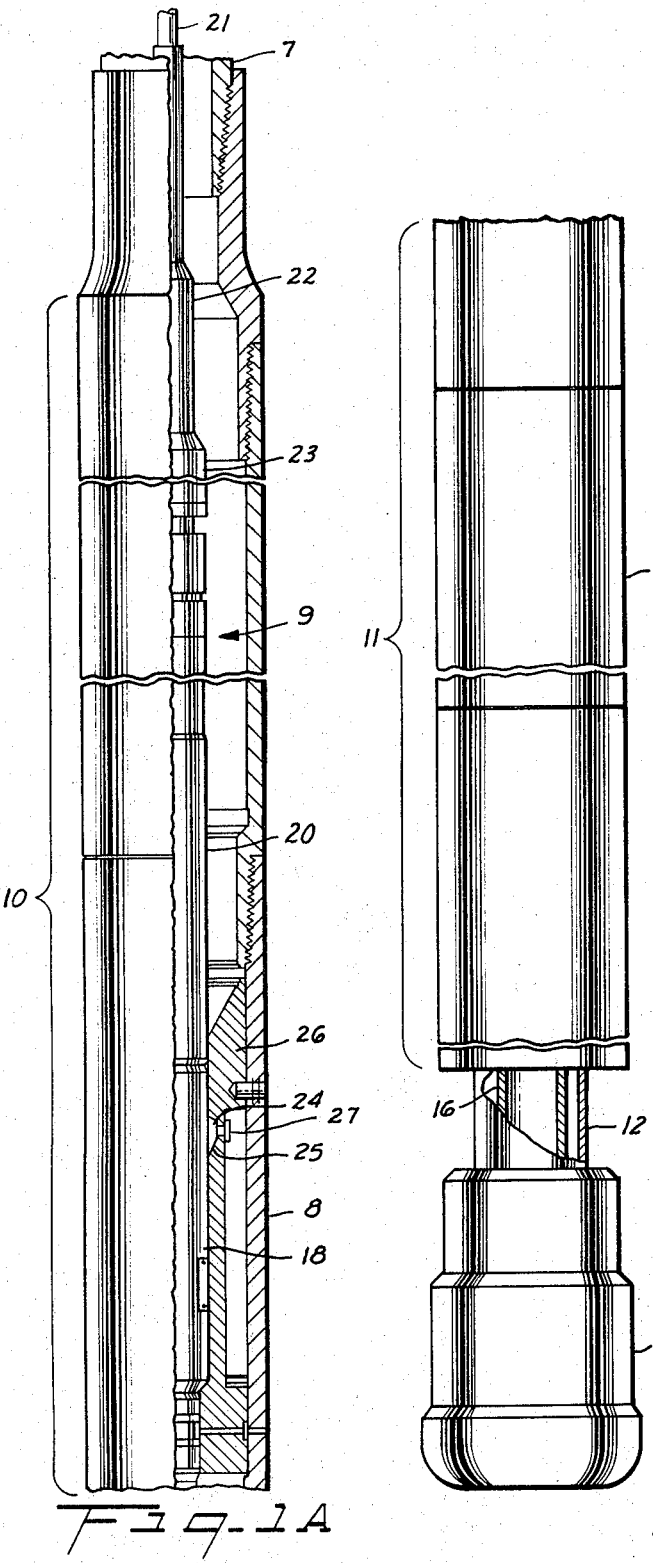
Luong Van Bey
INVENTOR.
BY
ATTORNEYS

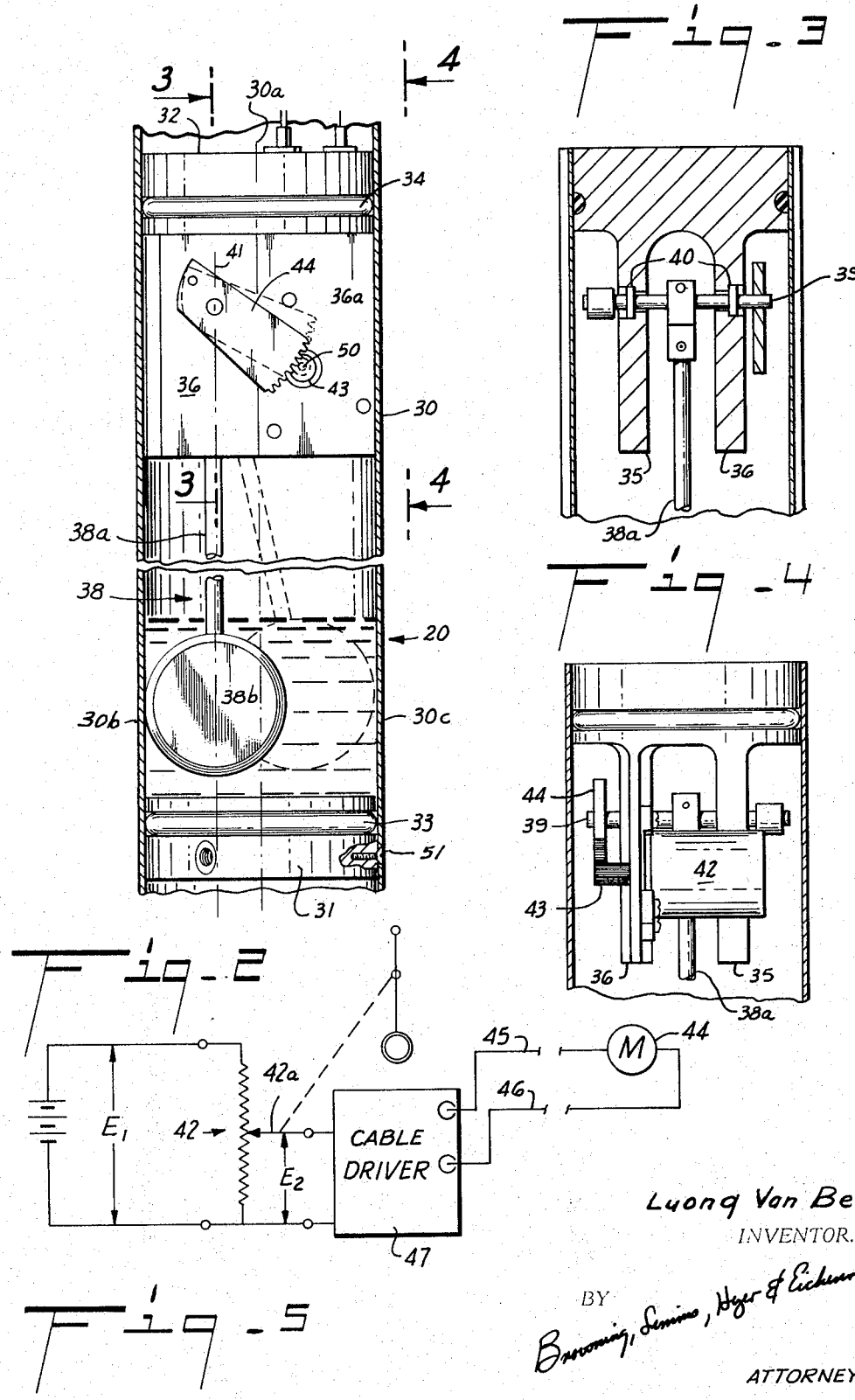

United States Patent Office 3,359,782
Patented Dec. 26, 1967

3,359,782
WELL BORE INCLINOMETER APPARATUS
Luong Van Bey, Houston, Tex., assignor, by mesne assignments, to Brown & Root, Inc., Houston, Tex.
Filed Aug. 17, 1965, Ser. No. 480,264
5 Claims. (Cl. 73—1)

ABSTRACT OF THE DISCLOSURE

Apparatus for measuring the inclination from the vertical of a well bore is disclosed. It includes a housing in which a pendulum is mounted to swing in one plane only. The pendulum includes in its plane of movement a reference axis that coincides with the longitudinal axis of the housing and which will coincide with the longitudinal axis of the part of the well bore in which the housing is located. The pendulum can swing between a first position, where it is parallel to the reference axis, and a second position, where it makes a predetermined angle with the reference axis. The movement of the pendulum between these two positions changes the parameter in an electrical circuit, which indicates the angle of the pendulum relative to the reference axis. Thus, by placing the apparatus in a well bore and rotating it slowly, the pendulum will swing to a position parallel to the axis of the well bore once each revolution of the housing. Also, this structural arrangement allows the indicating circuit to be calibrated simply by positioning the housing so that the pendulum is in both extreme positions of its travel and checking the indication of the circuit with the pendulum in these two positions. This permits the apparatus to be calibrated even though a perfectly vertical reference is not available.

---

This invention relates generally to apparatus for measuring the inclination of a well bore from the vertical, and refers more particularly, to such apparatus that may be calibrated without the need of aligning its reference axis in a vertical position.

In such inclinometer apparatus a vertical sensing unit is mounted so that the angle between the unit and a reference axis, usually the central longitudinal axis of the apparatus, which generally coincides with or is parallel to the longitudinal axis of the well bore, is the inclination from the vertical of the well bore. The amount of this inclination is indicated by electrical circuit means that includes an adjustable element, such as a potentiometer, that is operatively connected to the vertical sensing unit. Typical apparatus of this type is described in U.S. Patent No. 2,992,492 wherein a pendulum serves as the vertical sensing unit.

In such apparatus the inclination indicating means is usually an electrical meter that measures either voltage or current changes in the circuit as the setting of the adjustable element is changed by the vertical sensing unit. To calibrate the meter, the apparatus is positioned with the unit coinciding with or parallel to the reference axis of the housing, as it will be in a vertical well bore. The reading of the meter for this position is then noted and the scale of the meter marked accordingly. Then the apparatus is positioned with the reference axis at a known angle to the vertical, usually at the maximum angle that the apparatus is designed to measure, and the reading of the meter again is noted and the scale marked for the given angle.

If the output of the adjustable element changes in value linearly with angular changes of the vertical sensing unit with respect to the reference axis of the apparatus, the scale can be divided accordingly between the two calibration marks obtained in the above manner and the apparatus is ready for use.

To insure the continued accuracy of the apparatus it should be recalibrated periodically. This is no problem where it is returned to a service facility after each use or after a given number of uses. Where the apparatus is to be used more or less continuously while the well is being drilled and thus will be out of the hole and available for calibration only for short periods of time, calibration is a problem since facilities are not readily available at most drilling sites to hold the apparatus accurately at the desired angles for calibration purposes. Further, it is impossible to calibrate such apparatus on a floating drilling vessel, for the sea causes the vessel to roll and pitch continuously, which would impart continuous movement to the pendulum, particularly when attempting to calibrate the apparatus for the vertical position.

Therefore, it is an object of the invention to provide inclinometer apparatus that can be calibrated even though the apparatus is resting on a moving and/or unleveled support.

It is another object of this invention to provide inclinometer apparatus of the type described, which can be positioned to hold the pendulum in parallel alignment with the reference axis of the apparatus and at the maximum angle therebetween that the apparatus is designed to measure, even though the reference axis is not vertical or at the given maximum angle of inclination to the vertical.

It is another object of this invention to provide such apparatus that includes a pendulum to provide the vertical reference line for measuring the inclination of a well bore from the vertical, which can be calibrated for the minimum and maximum inclination it is designed to measure, while resting on a non-level surface at a drilling rig that is on land or one a floating drilling vessel that is rolling and pitching due to the motion of the sea upon which it floats.

These and other objects, advantages and features of this invention will be apparent to those skilled in the art from a consideration of this specification and attached drawings.

In accordance with this invention, a pendulum is mounted in a housing that is adapted to be run into a well bore. The pendulum is mounted to swing in a plane that includes or is parallel to an axis of the housing that provides a reference line that approximately coincides with or is generally parallel to the longitudinal axis of the well bore. Thus, the angle between the pendulum and the reference axis indicates the inclination of the hole in the manner described above. To enable such apparatus to be calibrated even on an unlevel and/or moving support, means are provided to hold the pendulum at two premeasured angles relative to the reference axis. In this way, the indicating means in the electrical circuit associated with the apparatus can be calibrated for two known positions of inclination of the reference axis regardless of the stability of the support upon which the apparatus is located.

In the embodiment that is preferred because of its simplicity and reliability, the pendulum is mounted in a housing to swing from one side of the housing to the other. When in engagement with one side it is parallel to the reference axis of the housing and thus is in the position it would assume in a vertical bore hole. By inclining the housing and orienting it so that the pendulum is resting against this side, the indicating means can be calibrated for a vertical bore hole. Then by rotating the housing until the pendulum swings to the opposite side of the housing, the indicating means can be calibrated for the maximum inclination that it can measure.

This invention has utility in connection with any inclinometer apparatus of the type described above. It has particular utility, however, where it is desired to calibrate the inclinometer apparatus at the drilling rig, as is the case when it is to be used more or less continuously during the drilling of the well. Thus, the embodiment of the invention to be described in detail below in connection with the attached drawings is adapted to supply continuous information to the surface on the inclination of the hole as it is being cored by a wire line retrievable core barrel assembly that is powered by a fluid turbine. Such equipment is called a "turbocorer."

In the drawings:

FIGURESE 1A and 1B are views partially in elevation and partially in vertical section of portions of a turbocorer having a wire line retrievable core barrel;

FIGURE 2 is a vertical sectional view of the preferred embodiment of the inclinometer of this invention adapted for use with the turbocorer of FIGURES 1A and 1B.

FIGURE 3 is a sectional view taken along line 3—3 of FIGURE 2;

FIGURE 4 is a view taken along line 4—4 of FIGURE 2; and

FIGURE 5 is a schematic diagram of the electrical circuit employed with the apparatus to provide a surface indication of the inclination of the well bore.

The turbocorer of FIGURES 1A and 1B comprises an outer assembly 8, which is connected to the drill pipe 7, and a retrievable inner assembly 9. The outer assembly includes an instrument housing section 10 and turbine section 11, which has an output shaft 12 driving core bit 13. The upper end of the instrument housing section is connected to the pipe string (not shown) which may include one or more drill collars to supply the drilling weight to the core bit and through which drilling fluid is circulated to power the turbine. The retrievable inner assembly extends through and is releasably latched in the outer assembly. It includes core barrel 16 which extends to a point adjacent the opening in core bit 13, latch 18, and inclinometer 20. The upper end of the assembly is connected to logging cable 21 through cable head 22 and swivel 23 in the conventional manner. The logging cable is used to run the assembly into and out of position in the outer assembly, to supply the instrument section thereof with electrical power, and to transmit to the surface the information signals produced by the instrument section.

Latch 18, which holds the inner assembly in position to receive the core, has a plurality of latch dogs 24, which are moved mechanically into and out of groove 25 in latch spider 26. Pins 27 engage the dogs and hold the inner barrel against rotation relative to the housing section of the turbocorer. Thus, rotation of instrument housing section 10 by the drill pipe will rotate the inner assembly when it is latched in position to receive a core. With a turbocorer it is not necessary to rotate the drill pipe to rotate the bit since it is rotated by the turbine. It is the usual practice, however, to rotate the drill pipe slowly, somewhere around 5 r.p.m. just to help keep it free in the hole. For a more complete description of down hole fluid engines of this type, see U.S. Patent No. 3,159,222.

Referring now to FIGURE 2, inclinometer 20 includes housing 30 which is connected into the inner barrel assembly with its longitudinal axis 30a coinciding with or parallel to the longitudinal axis of the well bore. Circular end plugs 31 and 32, provided with O-rings 33 and 34 close the ends of the housing. The plugs are held in place by machine screws 51, as shown. End plug 32 is provided with depending, spaced, parallel arms 35 and 36 to support the various moving elements of the inclinometer apparatus within the housing. Arm 35 extends only part way between the walls of the housing; whereas arm 36 extends substantially completely from wall to wall of the housing and has a portion 36a of reduced thickness.

Mounted on the arms to swing in a plane that includes longitudinal axis 30a of the housing, is pendulum 38, which comprises rod 38a and weight 38b. Shaft 39 extends through arms 35 and 36 and pivotally supports the pendulum. The shaft is rotatably supported by bearings 40. Thus, axis 30a or any line parallel thereto, such as line 41 which extends through the pivot point of the pendulum, can act as the reference line of the inclinometer. The angle between the reference line 41 and the pendulum, when it is vertical, is the inclination of the well bore.

In accordance with this invention, means are provided to retain the pendulum at two premeasured and substantially different angles to the reference line for calibration purposes, when the housing is inclined at two predetermined rotation orientations. In the embodiment shown, first stop means, comprising the portion 30b of the wall of the housing, engages weight 38b and keeps the pendulum from swinging from a position parallel to the longitudinal axis of the housing in one direction and second stop means comprising wall portion 30c are provided to limit the distance the pendulum can swing from its position parallel to the longitudinal axis of the housing.

Thus, to calibrate the apparatus for a vertical bore hole, all that is necessary is to incline the housing sufficiently for gravity to hold the pendulum in engagement with a side wall of housing 30. The housing should be inclined sufficiently to insure that the pendulum stays against the stop even though it is resting on a moving support, such as a floating drilling vessel. In fact, the preferred way of calibrating this apparatus is to lay the housing on its side with side 30b down, marking the meter scale for zero inclination, turning the housing over to put side 30c down, and marking the scale for maximum inclination. In the latter position, the pendulum will swing to the position shown in dotted lines in FIGURE 2.

Electric circuit means are provided that include surface indicating means for indicating the angle of the pendulum with respect to the longitudinal axis of the housing and a variable element which is operatively connected with the pendulum to change a parameter in the electrical circuit in accordance with the position of the pendulum. In the embodiment shown, the variable element in the circuit is potentiometer 42 mounted on arm 35a as shown in FIGURE 4. Movable tap 42a (FIGURE 5) of the potentiometer is moved by shaft 50, which extends outside of the housing of the potentiometer and upon which is mounted pinion 43. Gear segment 44 is mounted on shaft 39 for rotation therewith to drive pinion 43 and move tap 42a as pendulum 38 swings between the stop means.

The electric circuitry is shown schematically and greatly simplified in FIGURE 5. Potentiometer 42 is provided with a source of constant DC voltage $E_1$. Then, as movable tap 42a of the potentiometer is moved by the pendulum, $E_2$ the voltage between the tap and one end of the resistive element of the potentiometer will change and change the reading of meter 44 located at the surface. Conductors 45 and 46 in logging cable 21 connect the meter into the circuit. Cable driver 47 is located in the instrument housing of the inner barrel assembly and serves to condition the voltage $E_2$ for transmission to the surface. Various types of cable drivers can be adapted to perform this function.

With housing 30 mounted, as shown, in the inner assembly of the turbocorer, it will rotate with the assembly as it is rotated by the drill pipe. During each revolution the plane in which the pendulum can swing will be vertical twice. Only once will the pendulum be free to assume a vertical position, however, so only once during each revolution will the apparatus measure the inclination of the hole. The speed of rotation of the housing must be slow enough to give the pendulum time to reach a vertical position during each rotation. At rotating speeds around 5 r.p.m., there is ample time for this to occur. Preferably the movement of the pendulum is dampened by a liquid placed in the lower end of the housing 30. Also, preferably, a silicone oil, such s type DC200, 20 cs., is used since its viscosity is not affected greatly by changes in temperature.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for measuring the inclination from the vertical of a well bore, comprising a housing insertable into such well bore with a reference axis that generally coincides with or is parallel to the longitudinal axis of the part of the well bore in which the housing is located, a pendulum, means pivotally mounting the pendulum in the housing to swing in one plane only, said plane including or being parallel to such reference axis, electrical circuit means including electrical indicating means and an adjustable element operatively connected to the pendulum for varying a parameter in the circuit according to the angular position of the pendulum relative to said reference axis, first stop means to prevent the pendulum from swinging in one direction in said plane from the position it occupies with the reference axis vertical and second stop means to limit to a predetermined and measured amount the angle through which the pendulum can swing in said plane away from the first stop means, whereby the indicating means may be calibrated by positioning the housing to place the pendulum in engagement with the first stop means and marking the indication corresponding to vertical position and then positioning the housing to place the pendulum in engagement with the second stop means and marking the indication corresponding to the maximum measurable angle of inclination.

2. Apparatus for indicating at the surface of the earth the angular direction from the vertical of the longitudinal axis of a well bore including a housing insertable into the well bore with a reference axis approximately parallel to the axis of the well bore at the place of measurement, a pendulum pivotally mounted in the housing to swing in one plane only, said plane being parallel to or including the reference axis of the housing, electrical circuit means including electrical indicating means at the surface of the earth and an adjustable element operatively connected to the pendulum for varying a parameter in the circuit according to the angular position of the pendulum, relative to the reference axis of the housing, and stop means to keep the pendulum from swinging in one direction from a first position parallel to or coinciding with the reference axis of the housing and to limit to a predetermined amount the angle through which the pendulum can swing from said first position to permit the surface indicating means to be calibrated for the two extremes of travel of the pendulum by positioning the housing to move the pendulum alternately to the two extremes of its travel against the stop means.

3. Apparatus for measuring the angular deviation from the vertical of the longitudinal axis of a drilled hole as the hole is being drilled by a turbodrill attached to the lower end of a string of drill pipe, comprising a housing mounted in the drill pipe adjacent to the lower end thereof to rotate with the pipe with its longitudinal axis parallel thereto, a pendulum pivotally mounted in the housing to swing in a plane parallel to or including the longitudinal axis of the housing so the pendulum can swing to a vertical position, when the housing is inclined from the vertical, only when the plane in which it can swing is vertical, electrical circuit means including electrical indicating means at the surface and an adjustable element operatively connected to said pendulum for varying a parameter in said circuit according to the angular position of said pendulum relative to the longitudinal axis of the housing, and stop means to hold the pendulum from swinging in one direction from a position parallel to the longitudinal axis of the housing whereby the pendulum can swing to a vertical position when the housing is inclined therefrom only once with each rotation of the drill pipe.

4. Apparatus for measuring the inclination of a well bore that can be calibrated for a vertical well bore without having to be positioned vertically, comprising a housing insertable in such well bore with a reference axis generally parallel to the longitudinal axis thereof at the place of measurement, a pendulum, means mounting the pendulum to swing in one plane only, said plane being parallel to or including said reference axis, electrical circuit means including an adjustable element operatively connected to said pendulum for varying a parameter in said circuit according to the angular position of the pendulum with said reference axis and electrical indicating means responsive to the changing parameter, and means for holding the pendulum from swinging in one direction from a position parallel to or coinciding with said reference axis for calibrating the indicating means for a vertical well bore by inclining the housing to hold the pendulum against the stop means.

5. Apparatus for measuring the inclination from the vertical of a well bore, comprising a housing insertable into such well bore with an axis approximately parallel to the longitudinal axis thereof at the place of measurement, a shaft mounted in the housing extending perpendicular to the plane of said axis, a pendulum including a rod and a weight attached to one end of the rod, means pivotally mounting the pendulum to allow the weight thereof to swing from one side of the housing to the other in a plane that is parallel to or includes the said housing axis, electrical circuit means including electrical indicating means and an adjustable element operatively connected to the pendulum for varying a parameter in the circuit according to the angular position of the pendulum relative to said housing axis in its plane of movement, said pendulum being mounted in the housing with the rod parallel to said axis when the weight is in engagement with one side of the housing for calibrating the indicating means to indicate when the pendulum is vertical by tilting the housing to allow gravity to hold the weight in engagement with the said side of the housing.

References Cited

UNITED STATES PATENTS

| | | | |
|---|---|---|---|
| 2,317,632 | 4/1943 | Miller | 33—205.5 |
| 2,933,820 | 4/1960 | Bo Bo et al. | 33—205 |
| 3,037,295 | 6/1962 | Robertson | 33—205 |

LOUIS R. PRINCE, *Primary Examiner.*

S. C. SWISHER, *Assistant Examiner.*

UNITED STATES PATENT OFFICE
CERTIFICATE OF CORRECTION

Patent No. 3,359,782  December 26, 1967

Luong Van Bey

It is hereby certified that error appears in the above numbered patent requiring correction and that the said Letters Patent should read as corrected below.

In the heading to the printed specification, line 4, for "Brown & Root, Inc., Houston, Tex." read -- the United States of America as represented by the National Science Foundation --.

Signed and sealed this 21st day of January 1969.

(SEAL)
Attest:

Edward M. Fletcher, Jr.
Attesting Officer

EDWARD J. BRENNER
Commissioner of Patents